Figure 1:
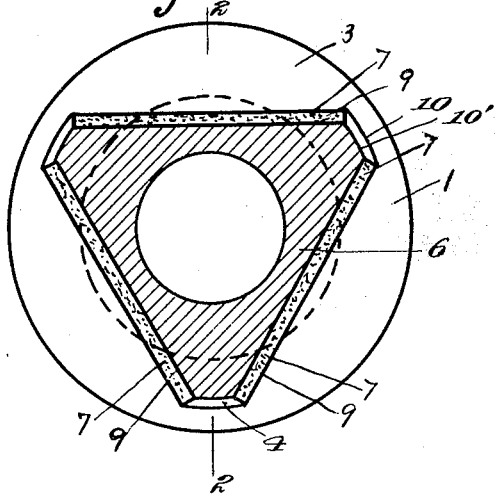

Aug. 8, 1933.  C. H. CLARK  1,921,910

FLEXIBLE COUPLING

Filed July 18, 1928

Inventor
Charles Haskell Clark.

Patented Aug. 8, 1933

1,921,910

UNITED STATES PATENT OFFICE 1,921,910

FLEXIBLE COUPLING

Charles Haskell Clark, New York, N. Y.

Application July 18, 1928. Serial No. 293,724

2 Claims. (Cl. 64—96)

This is a continuation in part of my application Serial No. 27,010, filed April 30, 1925 for Flexible couplings and now matured into Patent No. 1,689,861.

This invention relates to flexible couplings for coupling the ends of shafts together to turn about the same axis subject, of course, to end play and misalignment.

The main objects of the present invention are, to provide a very inexpensive, simple and very strong coupling for the above purpose; to provide a coupling very easy to align.

In this application I show and describe only the preferred embodiment of my invention simply by way of illustration of the practice of my invention as by law required. However, I recognize that my invention is capable of other and different embodiments, and that the various details thereof may be modified in various ways, all without departing from my said invention; therefore, the drawing and description herein are to be considered as merely illustrative and not as exclusive.

Figure 2:
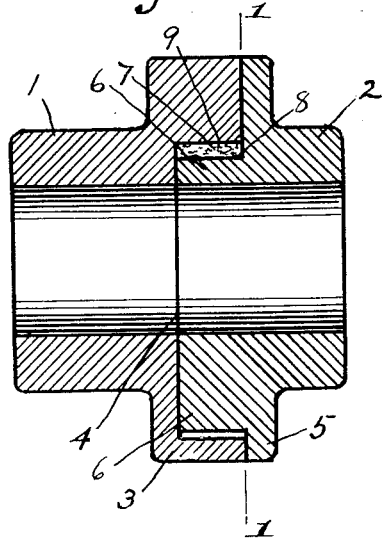

In the accompanying drawing:

Figure 1 represents a cross-sectional view on the line 1—1 of Fig. 2 through a coupling embodying my invention; and Figure 2 represents a longitudinal central sectional view through said coupling on the line 2—2 of Fig. 1.

Referring now in detail to the drawing, the hubs 1 and 2 are adapted to be mounted in any suitable manner upon the adjacent ends of two shafts, not shown, to be flexibly coupled to turn therewith. Hub 1 has an annular radially extending preferably integral flange or head 3 axially recessed as at 4, the walls or inner faces 9 of said recess defining a triangle with the angles rounded or flattened as at 10, all as illustrated in Fig. 1, and the hub 2 is formed with a preferably integral annular radially extending flange 5 of the same diameter as flange 3 and is provided also with a preferably integral axially extending protrusion or male coupling portion 6 triangular in cross-section with its points or tips flattened or rounded as at 10', and a cushioning means 7, preferably a leather strip is secured to each radial operative face 8 of said protrusion 6, and the said protrusion 6 with the cushioning means 7 applied thereto, considered as a single coupling element is of such size in cross section as to just snugly fit into the correspondingly shaped triangular recess 4 with the outer faces of the cushioning means 7 in, or substantially in, contact with the corresponding opposing operative faces 9 of the walls of said recess 4.

The construction described insures a satisfactory drive and tends to correct misalignment. It also enables both radial (so-called parallel) misalignment and also angular misalignment to be readily detected by the application of a rule across the peripheries of the flanges of the coupling members lengthwise of the coupling. Angular misalignment may also be detected by the application of calipers to the exterior faces of the flanges at a series of corresponding points in each face angularly displaced about the shaft.

It is immaterial whether the cushioning means 7 be secured to the operative faces 8 of the protrusion 6 or to the opposed operative faces 9 of the walls of the recess 4, but they will preferably be secured thereto by any suitable means, for instance by a suitable adhesive, shellac being used in the present embodiment. However, it is not of vital importance that they should be secured to either, they might be fitted in place between the opposing faces 8 and 9 as the coupling is applied to the shafts, said cushioning means serving to cushion and partially absorb between the hubs 1 and 2 the jerks and jars encountered in the use of such couplings, thus rendering the coupling slightly resilient as a whole.

The axially extending walls of the recess and those of the projecting portion of the male member, with the interposed cushioning means, provide extended face to face driving contact as against mere line contact, though this language does not imply that the opposed faces are always in contact throughout their entire area.

Having thus described my invention, what I claim and desire to secure by Letters Patent is:

1. A coupling having male and female hub members adapted to be mounted upon shafts to be coupled, the female member having a flange or head peripherally circular and having an axially extending recess triangular in transverse section and having axially extending walls, the male member having a flange of the same diameter as that of the flange or head of the female hub member and a portion extending axially from the flange of the male hub member corresponding substantially in cross-sectional size and shape to the said recess, having flat axial walls, projecting into and snugly fitting said recess for extended face to face driving contact of its walls with those of the recess, and cushioning means interposed between the opposed faces of the overlapping portions of said hubs in assembled relation, the said flanges promoting alignment and assisting in the detecting of misalignment.

2. A coupling having male and female hub members adapted to be mounted upon shafts to be coupled, the female member being peripherally circular and having an axially extending recess triangular in transverse section and having axially extending walls; the male member having a portion extending axially corresponding substantially in cross-sectional shape to the said recess, having flat axial walls, projecting into and snugly fitting said recess for extended face to face driving contact of its walls with those of the recess, and cushioning means interposed between the opposed faces of the overlapping portion of said hubs in assembled relation, the periphery of the male member being equal in outside diameter to the female member in order to promote alignment and assist in the detection of misalignment.

CHARLES HASKELL CLARK.